United States Patent [19]

Hollely et al.

[11] 4,273,294

[45] Jun. 16, 1981

[54] METHOD AND APPARATUS FOR CRYOGENIC GRINDING

[75] Inventors: David J. E. Hollely, Misterton, near Doncaster; Norris W. Shepherd, Worksop, both of England

[73] Assignee: Air Products and Chemicals, Inc., Allentown, Pa.

[21] Appl. No.: 44,296

[22] Filed: May 31, 1979

[30] Foreign Application Priority Data

Mar. 15, 1979 [GB] United Kingdom ............... 09168/79

[51] Int. Cl.³ ........................................... B02C 13/288
[52] U.S. Cl. ....................................... 241/18; 241/23; 241/62; 241/65; 241/189 R; 241/DIG. 37
[58] Field of Search ................... 241/DIG. 37, 65, 80, 241/97, 24, 186 A, 27, 189 R, 23, 62, 18

[56] References Cited

U.S. PATENT DOCUMENTS

| 2,226,330 | 12/1940 | Symons | 241/189 X |
| 2,919,862 | 1/1960 | Beike et al. | 241/DIG. 37 |
| 3,608,841 | 9/1971 | Wageneder | 241/189 R |
| 3,659,794 | 5/1972 | Hemesath | 241/189 R |
| 4,030,865 | 6/1977 | Kobayashi | 241/189 R X |
| 4,073,443 | 2/1978 | Danioni | 241/DIG. 37 |

Primary Examiner—Mark Rosenbaum
Attorney, Agent, or Firm—Thomas G. Ryder; E. Eugene Innis

[57] ABSTRACT

The production rate of a conventional cryogenic grinding system incorporating an impact mill may be increased by (a) providing means to allow at least 70% of the embrittled material entering the mill to leave the mill before it passes the inlet; and (b) providing means to restrict the flow of the cold gas through the impact mill.

The product leaving the impact mill is screened and any oversize is preferably recycled to the impact mill.

10 Claims, 3 Drawing Figures

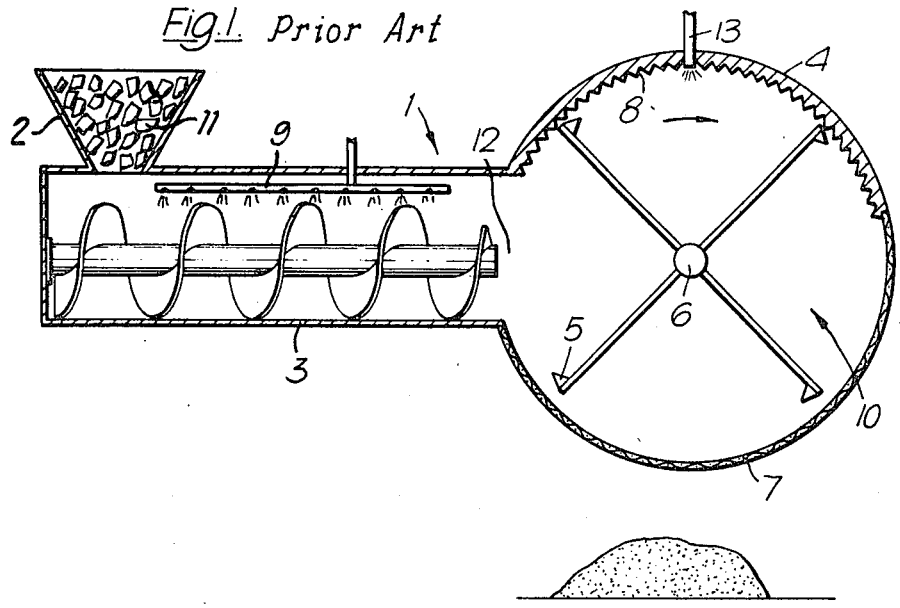
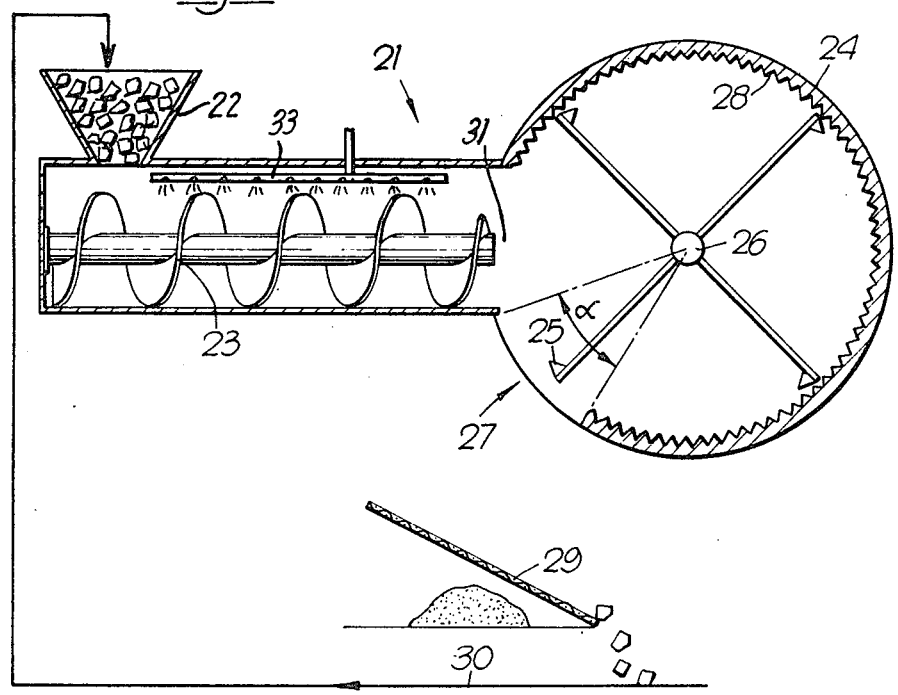

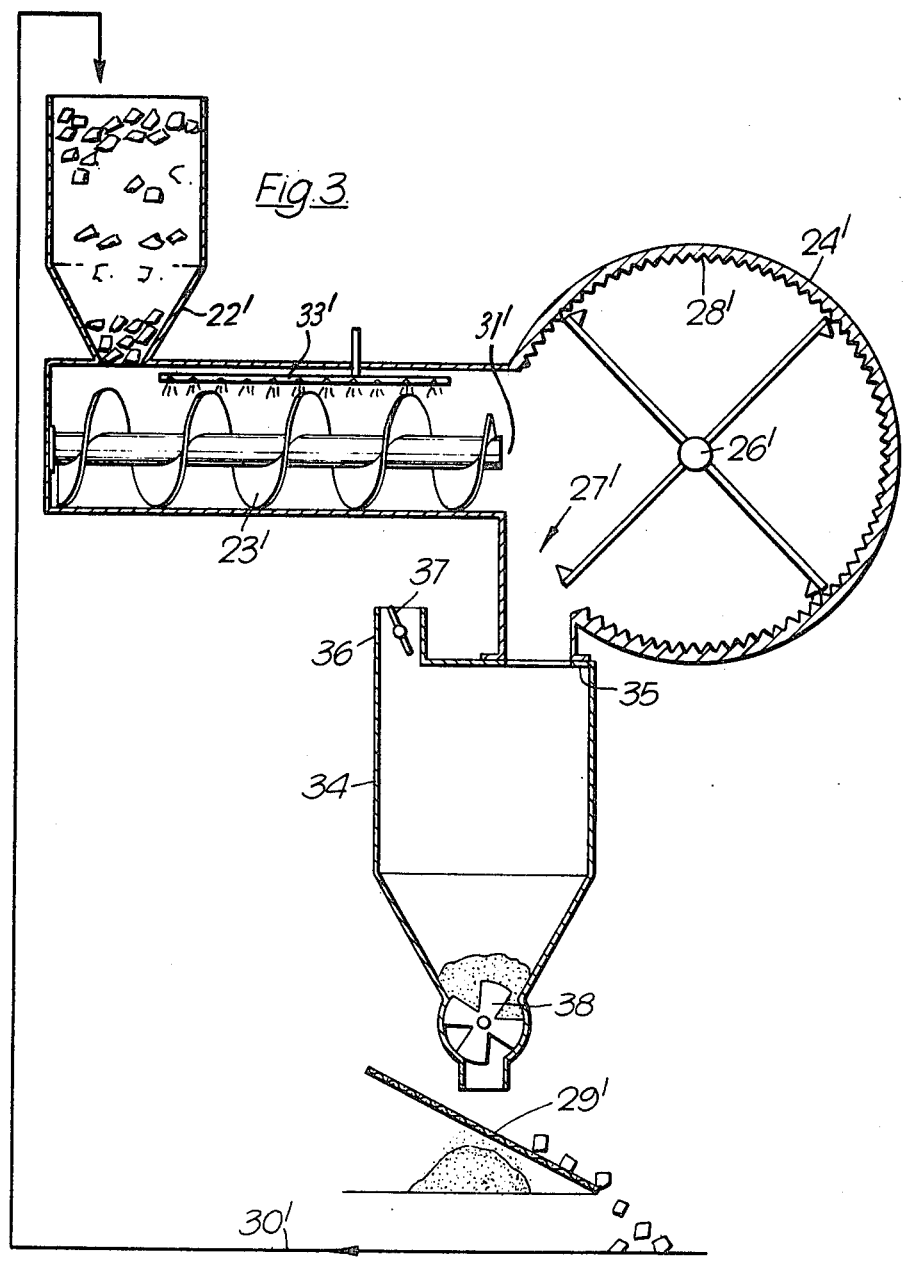

METHOD AND APPARATUS FOR CRYOGENIC GRINDING

This invention relates to a method and an apparatus for cryogenic grinding.

FIG. 1 of the accompanying drawings shows a conventional apparatus for cryogenically grinding rubber such as disclosed in U.S. Pat. No. 3,771,729. The apparatus is generally identified by reference numeral 1 and comprises a feed hopper 2, a screw conveyor 3, and a hammermill 4. The hammermill 4 has a cylindrical grinding chamber 10 which contains a multiplicity of hammers 5 which are pivotably mounted on a rotatable shaft 6 and which rotate in the direction of arrow A. The cylindrical grinding chamber 10 is also provided with a screen 7 and a multiple deflector lining 8 which subtends an angle of 150° at the rotatable shaft 6. A spray bar 9 and a spray nozzle 13 are arranged to introduce liquid nitrogen into the screw conveyor 3 and hammermill 4 respectively.

In use, chunks of rubber 11 are embrittled in screw conveyor 3 and are then introduced into the hammermill 4 through inlet 12. On entering the hammermill 4 the chunks of embrittled rubber are ground by repeated impaction against the rotating hammers 5 and the multiple deflector lining 8.

The rubber remains in the hammermill 4 until it has been ground to a size sufficiently small to pass through screen 7. In practice about 65% of the rubber which enters the hammermill 4 passes the inlet 12 of the hammermill 4 several times before it leaves the hammermill 4 through the screen 7.

During grinding, a stream of liquid nitrogen is continually injected into the hammermill 4 through spray nozzle 13 to cool the cylindrical grinding chamber 10 and try to maintain the rubber in its embrittled state. At the same time the rotating hammers 5 act like a fan and suck vaporized nitrogen through the screw conveyor 3 together with a small volume of air which passes through the chunks of rubber 11 in the feed hopper 2. The mixture of gaseous nitrogen, air and ground rubber leaves the hammer mill 4 through screen 7 at a gas outlet temperature of about −180° C.

We have now discovered that the production rate of the apparatus shown in FIG. 1 can be increased and simultaneously, the nitrogen consumption decreased.

According to one aspect of the present invention, there is provided a method of cryogenically grinding material, which method comprises the steps of advancing the material to be ground towards an impact mill, embrittling said material by bringing said material into direct contact with liquid nitrogen and a stream of cold vaporized nitrogen the major portion of which is travelling away from said impact mill in countercurrent flow with said material; introducing said embrittled material through the inlet of said impact mill; removing at least 70% of the embrittled material entering said mill before it passes said inlet; and providing means to restrict the flow of gaseous nitrogen from said mill so that only a minor portion of said nitrogen passes through said impact mill.

Advantageously, at least part of any material which will not pass through said screen is re-embrittled and returned to said impact mill.

The present invention also provides apparatus for cryogenically grinding material which apparatus comprises means for cryogenically embrittling said material; an impact mill having an inlet to receive said material when embrittled and an outlet for permitting at least 70% of the embrittled material entering said mill to leave said mill without passing said inlet; means for restricting the flow of cold gas leaving said impact mill; and means for screening the material leaving said mill.

Preferably the apparatus also includes a conveyor for returning the material which will not pass through said screen to the means for cryogenically embrittling said material.

Advantageously, said impact mill consists of a hammermill although the invention is applicable to other mills in which grinding is achieved by impacting the material to be ground against a moving member, for example, a rotary beater mill, a fan mill, a turbo mill and a pin disc mill.

Conveniently, the impact mill has a cylindrical grinding chamber and the outlet comprises an opening which is preferably situated adjacent the inlet and which preferably subtends an angle of between 5° and 60°, preferably between 20° and 50° and more preferably between 40° and 50° at the axis of the grinding chamber and which extends substantially the entire width of said grinding chamber. Such opening should preferably be totally unobstructed, but for certain materials a grid type opening could be utilised provided that a minimum of 70% of the embrittled material entering the mill can leave the mill before passing the inlet.

Preferably, the portion of the wall of the grinding chamber between the inlet and the outlet is provided with a multiple deflector lining.

Whilst we have specified that a minimum of 70% of the embrittled material entering the mill should leave the mill before passing the inlet, we would strongly recommend that this percentage should be raised to at least 85% for commercial operation and more preferably to at least 95%.

Preferably, the means for restricting the flow of gas through the impact mill comprises a valve. Such a valve could be mounted in the outlet of said mill or more conveniently, in the top of a gas impervious container communicating with the outlet of said mill. Although not recommended sufficient restriction can be achieved by closing off the duct to the conventional fines filter and tying a small pervious bag on the outlet of the hammer mill. Whilst this will work for short periods it is generally unreliable since initially the bag offers two little resistance to the flow of nitrogen from the mill whilst, as the bag fills, it offers too much resistance resulting in the mill overheating.

BRIEF DESCRIPTION OF THE DRAWINGS

For a better understanding of the invention, reference will now be made, by way of example, to FIGS. 2 and 3 of the accompanying drawings in which FIG. 2 is a schematic cross-section through our first experimental apparatus; and FIG. 3 is a schematic cross-section through our second experimental apparatus.

Referring to FIG. 2, there is shown an apparatus for cryogenic grinding which is generally identified by reference numeral 21. The apparatus 21 comprises a feed hopper 22, a screw conveyor 23 and a hammermill 24 provided with a multiplicity of hammers 25 which are pivotably mounted on a rotatable shaft 26 and which rotate in the same clockwise direction as in FIG. 1. The hammermill 24 is provided with an inlet 31, a multiple deflector lining 28, and an opening 27 which is situated adjacent the inlet and subtends an angle of 40° at rotatable shaft 26. A spray header 33 is arranged to inject liquid nitrogen into the screw conveyor 23 in which it contacts the material and is vaporized to form gaseous nitrogen.

A vibrating screen 29 is situated downstream of opening 27 and a conveyor 30 extends between screen 29 and feed hopper 22.

In use, chunks of rubber are embrittled to a core temperature of −90° C. in screw conveyor 23 and are then introduced into the hammermill 24. The embrittled rubber enters the hammermill 24 through inlet 31 and is ground by repeated impaction against hammers 25 and multiple deflector lining 28.

The opening 27 is sufficiently large so that more than 98% of the rubber introduced into the hammermill 24 leaves the hammermill through opening 27 without passing inlet 31.

The ground rubber is deposited on the vibrating screen 29 through which particles of the required size pass. The oversize rubber is then returned to feed hopper 22 by conveyor 30.

The apparatus shown in FIG. 3 is generally similar to that shown in FIG. 2 and parts having a similar function have been identified by the same reference numerals with the addition of an apostrophe. The major difference is that the hopper 22' is somewhat higher than usual and a container 34 is arranged below the hammermill 24' and has an inlet 35 which is arranged to receive ground rubber as it leaves the opening 27'. The container 34 has a gas outlet 36 which is provided with a butterfly valve 37. In use, the butterfly valve 37 is set to restrict the flow of vaporized nitrogen gas through the hammermill 24' to the minimum consistent with the hammermill 24' operating satisfactorily. For most materials this setting of the butterfly valve 37 corresponds to the temperature of the nitrogen passing through opening 27' being in the range −60° C. to −100° C. although this varies according to the type of material being ground. This arrangement has several advantages. Firstly, less refrigeration is wasted since the gas leaving the hammermill 24 is much warmer than was previously obtained. In this connection the actual outlet temperature is set to the warmest possible without the power consumption of the mill rising excessively. Secondly, because of the restriction the majority of the gaseous nitrogen evolved from the liquid nitrogen introduced into the screw conveyor travels away from the mill in countercurrent flow with the chunks of rubber moving towards the mill. This flow has the added advantage of inhibiting moist air entering the system and the water vapour freezing out.

The ground material collects in the bottom of container 34 and is periodically dropped onto vibrating screen 29 by rotary valve 38.

If desired, the setting of the butterfly valve 37 can be varied automatically in response to signals from a temperature sensor set in the proximity of opening 27'.

Tests were carried out first using the apparatus shown in FIG. 1 and then using the same apparatus modified as shown in FIG. 2 and FIG. 3 but without recycle. In all cases, the mill used was powered by a five horse power electric motor.

The apparatus shown in FIG. 1 produced 125 pounds of rubber crumb per hour which would pass through a −30 mesh screen. The liquid nitrogen consumed during this time was 150 lbs.

The apparatus shown in FIG. 2 (but without recycle) produced 255 pounds of rubber crumb per hour which would pass through a −30 mesh screen. The liquid nitrogen consumed during this time was 200 lbs. A two-fold increase in production was thus achieved using a 33% increase in liquid nitrogen.

The apparatus shown in FIG. 3 (but without recycle) produced 255 pounds of rubber crumb per hour which would pass through a −30 mesh screen. The liquid nitrogen consumed during this time was 150 lbs. thus giving a two-fold increase in production using the same amount of liquid nitrogen as used in the apparatus shown in FIG. 1.

A similar series of tests was then conducted with a polyamide. In this particular case a three-fold increase in production rate was achieved. It was also noted that the amount of liquid nitrogen introduced per pound of feed could be reduced in the apparatus shown in FIGS. 2 and 3 whilst maintaining a production rate far in excess of the apparatus shown in FIG. 1.

When practising this invention it is recommended that initial tests be carried out to ensure that the rubber (or other material) entering the mill is thoroughly embrittled throughout. If this is not done then far less efficient operation results.

What is claimed is:

1. A method of cryogenically grinding pieces of material, with substantially less consumption of cryogenic refrigerant than heretofore required, comprising the steps of:
    (a) pre-cooling the pieces of material to be ground in counter-current heat exchange with a cold gaseous cryogenic refrigerant,
    (b) further cooling and embrittling the pre-cooled pieces of material in direct contact with a liquid cryogenic refrigerant, and thereby vaporizing said liquid cryogenic refrigerant and generating said cold gaseous cryogenic refrigerant,
    (c) continuing said cooling and embrittling step for a sufficient contact time to thoroughly embrittle said pieces throughout,
    (d) introducing said thoroughly embrittled pieces of material through an inlet of a rotary impact mill,
    (e) passing said thoroughly embrittled pieces of material through said mill in an arcuate path comprising more than 270° of travel through said mill,
    (f) discharging on the first pass through said mill at least 70% of the entering embrittled material through a nonscreened discharge opening subtending an angle of between 5° and 60°, and
    (g) restricting the flow of said cold refrigerant gas which is discharged from said mill to a sufficient degree to cause the majority of said cold gaseous refrigerant which is generated to flow in counter-current heat exchange with said pieces of material according to step (a).

2. The method according to claim 1, including the step of removing at least 85% of the embrittled material entering said mill on the first pass therethrough.

3. The method according to claim 1, including the step of removing at least 95% of the embrittled material entering said mill on the first pass therethrough.

4. The method according to claim 1, including the step of separating oversize pieces discharged from said mill, and recycling said oversize pieces to step (a).

5. Apparatus for cryogenically grinding material comprising:
    (a) a pre-cooling hopper,
    (b) mixer-conveyor means connected to said hopper and including means for injecting liquid cryogenic refrigerant into direct contact with material therein for embrittling said material and generating cold gaseous refrigerant, (c) a rotary mill having an inlet connected to receive embrittled material from said mixer-conveyor means, and including non-screened outlet means located more than 270° degree apart from said mill inlet in the direction of rotation of the mill, (d) said non-screened outlet means subtending an angle of between 5° and 60° for discharging at least 70% of the material on the first pass through said mill, and (e) means for receiving ground material from said mill outlet means and including gas flow restricting means for reducing the flow of gas discharged from said mill to a minor portion of the cold gas generated in the mixer-conveyor and thereby forcing the major portion of the cold gas in counter-current heat exchange with the material in said mixer-conveyor means and in said feed hopper.

6. The apparatus as claimed in claim 5 in which said non-screened outlet means subtend an angle of between 20° and 50°.

7. The apparatus as claimed in claim 5 in which said non-screened outlet means subtend an angle of between 40° and 45°.

8. The apparatus as claimed in claim 5 in which said non-screened outlet means is positioned adjacent said mill inlet.

9. The apparatus as claimed in claim 5 in which a multiple deflector lining extends around the entire arcuate path between said mill inlet and said mill outlet means.

10. The apparatus as claimed in claim 5 in which said gas flow restricting means comprise gas flow control valve means having variable positions for varying the amount of cold gas flowing through and discharged from said mill versus that flowing in counter-current heat exchange with said pieces of material being cooled thereby.

* * * * *